(12) United States Patent
Goerl et al.

(10) Patent No.: US 6,878,759 B2
(45) Date of Patent: Apr. 12, 2005

(54) RUBBER PELLETS COMPRISING SILICATIC AND OXIDIC FILLERS

(75) Inventors: Udo Goerl, Recklinghausen (DE); Reinhard Stober, Hasselroth (DE); Matthias Schmitt, Neckargemuend (DE)

(73) Assignee: Degussa AG, Duesseldorf (DE)

( * ) Notice: Subject to any disclaimer, the term of this patent is extended or adjusted under 35 U.S.C. 154(b) by 148 days.

(21) Appl. No.: 10/273,304

(22) Filed: Oct. 18, 2002

(65) Prior Publication Data

US 2003/0119983 A1 Jun. 26, 2003

(30) Foreign Application Priority Data

Oct. 18, 2001 (DE) .......................................... 101 51 430

(51) Int. Cl.$^7$ ................................................. C09K 9/06
(52) U.S. Cl. ...................... 523/212; 523/205; 523/209; 524/424; 524/588
(58) Field of Search ............................... 523/212, 205, 523/209; 524/424, 588

(56) References Cited

U.S. PATENT DOCUMENTS

| | | | | |
|---|---|---|---|---|
| 5,486,551 A | * | 1/1996 | Polmanteer | ................... 523/212 |
| 5,674,935 A | * | 10/1997 | Evans et al. | ................... 524/588 |
| 5,846,506 A | | 12/1998 | Esch et al. | |
| 5,859,117 A | | 1/1999 | Goerl et al. | |
| 5,925,708 A | | 7/1999 | Esch et al. | |
| 6,277,902 B1 | * | 8/2001 | Scholl | ......................... 523/213 |
| 6,329,449 B1 | | 12/2001 | Goerl et al. | |
| 6,340,724 B1 | | 1/2002 | Goerl et al. | |
| 6,391,944 B2 | * | 5/2002 | Canpont et al. | ............. 523/212 |
| 6,433,064 B1 | | 8/2002 | Goerl et al. | |
| 6,437,042 B2 | * | 8/2002 | Kobayashi et al. | .......... 524/837 |
| 6,548,584 B1 | | 4/2003 | Goerl et al. | |

FOREIGN PATENT DOCUMENTS

| | | |
|---|---|---|
| EP | 0 900 829 | 3/1999 |
| EP | 0 955 344 | 11/1999 |
| EP | 1 209 193 | 5/2002 |

OTHER PUBLICATIONS

U.S. Appl. No. 09/580,526, Ernst, et al. filed May 30, 2000.
U.S. Appl. No. 09/576,179.
U.S. Appl. No. 08/870,591, Esch et al..
U.S. Appl. No. 10/273,304, Goerl et al., Oct. 18, 2002.

* cited by examiner

Primary Examiner—Jeffrey B. Robertson
(74) Attorney, Agent, or Firm—Oblon, Spivak, McClelland, Maier & Neustadt, P.C.

(57) ABSTRACT

The present invention provides a process, which includes:
a) suspending:
   at least one filler selected from the group including silicatic filler, oxidic filler, and a mixture thereof,
   0.5 to 7% by weight, based on the weight of the filler, of at least one polysiloxane hydrophobicizing agent, and
   0.1 to 2% by weight, based on the weight of the filler, of at least one non-ionic surfactant,
   in water at a temperature of 10 to 60° C.,
   to prepare a suspension having a solids content of 0.5 to 15% by weight, based on the weight of the suspension;
b) contacting a rubber latex emulsion and the suspension, to prepare a mixture;
c) contacting the mixture with at least one acid to lower the pH of the mixture to 2.5–7, to prepare a filled rubber powder precipitate and a liquid;
d) separating at least a portion of the liquid from the filled rubber powder precipitate, to form a filtercake comprising the filled rubber powder precipitate;
e) optionally shaping, comminuting, or pelletizing the filtercake, and
f) drying to a moisture level of 3% by weight.

21 Claims, No Drawings

RUBBER PELLETS COMPRISING SILICATIC AND OXIDIC FILLERS

BACKGROUND OF THE INVENTION

1. Field of the Invention

The invention relates to the preparation and use of rubber powders or pellets based on rubber-latex emulsions and containing silicatic and/or oxidic fillers, by precipitation from an aqueous phase.

2. Discussion of the Background

A wide variety of publications and patents (WO PCT/EP 99/01970; WO PCT/EP 99/0171; EP 99 117 178.6; U. Görl, K.-H. Nordsiek, Kautsch. Gummi Kunstst. 51 (1998) 200; Rubber World 3/01 and 4/01; and U. Görl, M. Schmitt, O. Skibba, Gummi Fasern Kunstst. 54 (2001) 532) have appeared relating to the purpose and benefits of the use of rubber powder and potential processes for its preparation.

The interest in pulverulent rubber/filler masterbatches can be explained as a necessary result of the processing technology used in the rubber industry (E. T. Italiander, Gummi Fasern Kunstst. 50 (1997) 456), where rubber mixtures are prepared with high costs for energy, time, and personnel. One prime reason for this is that the rubber raw material is in bale form, and its processing requires the mechanical incorporation and dispersion of large amounts of active fillers (industrial carbon blacks, silicas, and naturally occurring fillers) into the rubber phase.

In industry, the mechanical kneading process generally takes place batchwise in large internal mixers or on roll mills, generally in a process with two or more stages.

To simplify these complicated steps in a process (U. Görl, K.-H. Nordsiek, Kautsch. Gummi Kunstst. 51 (1998) 200; Rubber World 3/01 and 4/01; and U. Görl, M. Schmitt, O. Skibba, Gummi Fasern Kunstst. 54 (2001) 532) or even provide an opportunity for developing and introducing new continuous processes (E. T. Italiander, Gummi Fasern Kunstst. 50 (1997) 456; R. Uphus, O. Skibba, R.-H. Schuster, U. Görl, Kautsch, Gummi Kunstst. 53 (2000) 279), rubber powder technology (Delphi-Report 'Künftige Herstellungsverfahren in der Gummiindustrie' (Future production processes in the rubber industry), Rubber J. 154 (1972) 20; and Kautsch. Gummi Kunstst. 26 (1973) 127) has long been regarded as one of the most suitable options. It combines the necessity for prior incorporation of a filler with a specific form of presentation, which is a powder or, respectively, pellets capable of free flow and therefore capable of automatic metering and conveying.

Whatever the type of filler (carbon blacks, silicas, naturally occurring fillers, etc.), the rubber powders/pellets are prepared by precipitation from a mixture of a filler suspension in water and a rubber-latex emulsion, by using a Brönsted and/or Lewis acid to lower the pH (WO PCT/EP 99/01970; WO PCT/EP 99/0171; EP 99 117 178.6; U. Görl, K.-H. Nordsiek, Kautsch. Gummi Kunstst. 51 (1998) 200; Rubber World 3/01 and 4/01; and U. Görl, M. Schmitt, O. Skibba, Gummi Fasern Kunstst. 54 (2001) 532). The preparation may be carried out batchwise or continuously (EP 00 104 112.8).

The formation of rubber powder/pellets, composed of polymer and filler, via addition of acid can be thought of as adsorption of the rubber on the filler. Here, the interaction between the filler surface and the rubber chains is important. The strength of this interaction is in turn determined by the polarity differences between the two starting materials: rubber and filler.

Industrial carbon blacks and most familiar grades of rubber are non-polar, i.e. have a high level of mutual interaction, the result being that rubber powder/pellets composed of these two components are generally capable of easy preparation from the abovementioned precipitation process without using any other additives or measures.

In contrast, silicatic and oxidic fillers are polar. The level of interaction between these fillers and non-polar grades of rubber is therefore extremely low. To prepare rubber powder/pellets using these products it is therefore essential to increase the level of mutual interaction. The simplest way to do this is to hydrophobicize the filler surface with the aid of suitable hydrophobicizers. This gives the filler surface a more organic, and therefore less polar, nature, and there is therefore an increase in interactive forces between the filler and the rubber. This measure, which is generally undertaken during preparation of the filler suspension (EP 99 117 178.6; DE 100 56 696.0), permits products to be obtained which comply with specification even when using the abovementioned silicatic and oxidic fillers.

A large of number of patents and publications have appeared (EP 99 117 178.6; DE 100 56 696.0) which include the above-mentioned hydrophobicizing procedure. The hydrophobicizing agent which they describe uses organosilanes which, together with the silicatic or oxidic filler, are suspended in water, in particular with concomitant use of compatabilizers and emulsifiers. After addition of the rubber emulsion and then precipitation via addition of acid, the desired rubber powder forms as a suspension in the water. After mechanical removal of most of the process water, the product is dried thermally to a residual moisture content of less than 3%. The organosilane reacts with the silica at an elevated temperature with formation of siloxane bonds, whereupon large amounts of alcohol, generally ethanol, are liberated (U. Görl, M. Schmitt, paper presented at a DKF conference in Budapest, April 2001).

The use of organosilanes, and particularly the important rubber-technology compounds bis(triethoxysilylpropyl) tetrasulphane and, respectively, disulphane (TESTPT and TESPD) as hydrophobicizing agent for the filler in the process for preparing the rubber powder is certainly logical in this context, since the high-silica-content mixtures increasingly used in car tire tread mixtures since the beginning of the 90's contain relatively large amounts of the abovementioned organosilanes (EP 0 501 227; U.S. Pat. No. 5,227,245; U. LeMaitre, 'The Tire Rolling Resistance', AFICEP/DKG Meeting, Mulhouse, France 1993; and G. Agostini, J. Bergh, Th. Materne, paper presented at the Akron Tire Group Technology, Akron, Ohio/USA, Oct. 1994). The use of the silane in the PR preparation process achieves two objectives: firstly that the products are prepared via an increase in the level of filler/rubber interaction (hydrophobicization) and secondly that the filler passed on within the product is presilanized and can be further processed by the customer without the risk of further release of ethanol. This specific property of the product reduces the number of problems, which the user has to solve during the current process, when silane is added directly in the internal mixer. Desirable features would be a marked shortening of the mixing time, the elimination of ethanol releases in the mixing area, and an improvement in vulcanization-related property profile.

The high price of organosilanes, the complex and time-consuming mixing process (A. Hunsche, U. Görl, A. Müller, M. Knaack, Th. Göbel, Kautsch. Gummi Kunstst. 50 (1997) 881; and A. Hunsche, U. Görl, H. G. Koban, Th. Lehmann, Kautsch. Gummi Kunstst. 51 (1998) 525), and the release of large amounts of ethanol (U. Görl, A. Parkhouse, Kautsch. Gummi Kunstst. 52 (1999) 493) mean that organosilanes are used only when it is impossible to achieve the required vulcanizate property profile without the use of these substances. This generally applies to high-performance mixtures, e.g. tire sector applications, specifically those within the tread (EP 0 501 227; U.S. Pat. No. 5,227,245; U. LeMaitre, 'The Tire Rolling Resistance', AFICEP/DKG Meeting, Mulhouse, France 1993; and G. Agostini, J. Bergh, Th. Materne, paper presented at the Akron Tire Group Technology, Akron, Ohio/USA, October 1994).

The vast majority of rubber mixtures which contain pale-coloured fillers, often including naturally occurring fillers, use no organosilane or at best only small amounts of organosilane. Examples would be almost the entire shoe sole sector, floor coverings, simple extrusion items, such as profiles, webs, hoses, and items produced by injection moulding, for example gaskets and other mouldings.

A wide variety of grades of pale-coloured silicatic and oxidic fillers is used in the rubber industry. These are the fumed and precipitated silicas and silicates, clays, siliceous chalks, chalks, hydroxides, such as aluminium hydroxides and magnesium hydroxides, and also oxides, such as calcium oxide, zinc oxide, magnesium oxide, and titanium dioxides. As mentioned above, all of these fillers are polar and require hydrophobicization of their surface during the preparation of rubber powder/pellets with use of aqueous emulsions of a non-polar rubber.

If these products are divided according to their surface chemistry, two classes can be distinguished. The surface of clays and siliceous chalks has a considerable number of silanol groups with which organosilanes, for example, can react to form siloxane bonds, hydrophobicizing the filler. At the same time, the reaction product produced from filler and silane represents the first constituent step within the reaction scheme for a bifunctional organosilane in a rubber application. As processing continues to the finished rubber item, specifically during vulcanization, the reaction of the rubber-reactive silane function with the rubber matrix finally takes place with formation of covalent rubber-filler bonds. It is finally these bonds which permit the use of high-activity silicas in high-performance mixtures, in particular in the tire sector.

In contrast, chalks of the hydroxides and oxides mentioned have no silanol groups or, due to their low $N_2$ surface area, only a small number of silanol groups, with which an organosilane could react chemically to form a siloxane bond. There is therefore no formation of rubber-filler bonds which could significantly improve the property profile of the mixtures containing these fillers. Here again, the organosilanes are not used for the reason stated above.

In summary, it may be stated that for mixtures which contain silicatic and/or oxidic fillers and which do not need rubber-filler bonds in order to achieve the property profile required, i.e. simple mixtures, it is desirable to find a low-cost alternative which merely hydrophobicizes the filler and thus permits preparation of rubber powder. These considerations then also make it unimportant whether and to what extent the filler used bears reactive groups on its surface.

SUMMARY OF THE INVENTION

Accordingly, one object of the present invention is to avoid the problems with conventional compounds and processes mentioned above.

This and other objects have been achieved by the present invention, the first embodiment of which provides a process, which includes:
a) suspending:
  at least one filler selected from the group including silicatic filler, oxidic filler, and a mixture thereof,
  0.5 to 7% by weight, based on the weight of the filler, of at least one polysiloxane hydrophobicizing agent, and
  0.1 to 2% by weight, based on the weight of the filler, of at least one non-ionic surfactant,
  in water at a temperature of 10 to 60° C.,
  to prepare a suspension having a solids content of 0.5 to 15% by weight, based on the weight of the suspension;
b) contacting a rubber latex emulsion and the suspension, to prepare a mixture;
c) contacting the mixture with at least one acid to lower the pH of the mixture to 2.5–7, to prepare a filled rubber powder precipitate and a liquid;
d) separating at least a portion of the liquid from the filled rubber powder precipitate, to form a filtercake comprising the filled rubber powder precipitate;
e) optionally shaping, comminuting, or pelletizing the filtercake, and
f) drying to a moisture level of 3% by weight.

Another embodiment of the invention provides a composition, prepared by the above process.

Another embodiment of the invention provides a method, which includes contacting the above composition with at least one selected from the group including a surface, a gas phase organic substance, and an aqueous phase organic substance.

DESCRIPTION OF THE PREFERRED EMBODIMENTS

Various other objects, features and attendant advantages of the present invention will be more fully appreciated as the same becomes better understood from the following detailed description.

A preferred embodiment of the present invention is a process for preparing rubber powders/pellets based on aqueous rubber latex emulsions or lattices and containing silicatic and/or oxidic fillers, which includes
a) suspending the silicatic and/or oxidic filler, one or more hydrophobicizing agents selected from the group including the polysiloxanes in amounts of from 0.5 to 7%, in particular from 1 to 3%, based on the filler, one or more non-ionic surfactants in amounts from 0.1 to 2%, in particular from 0.25 to 1%, based on the filler, at from 10 to 60° C. in water, preferably room temperature, and thus preparing a suspension with solids content of from 0.5 to 15%, preferably from 5 to 12%,
b) then adding the rubber latex emulsion to the filler suspension, with stirring,
c) using an acid, preferably sulphuric acid or aluminium sulphate, to lower the pH of the mixture to 2.5–7, preferably from 3.5 to 5, in water,
d) using a suitable method of solid/liquid separation to isolate the precipitated rubber powder from most of the process water,
e) where appropriate, using suitable measures to shape the resultant filtercake, and
f) using a suitable drying process to dry the pulverulent or pelletized product to a final moisture level of less than 3%.

Preferably, the hydrophobicizing agent for the filler is one or more polysiloxanes having the following formula I:

(Formula I)

wherein:
n=1–1000;
R=—(CH$_2$)$_m$—H, O—(CH$_2$)$_z$—H, OH, vinyl;
m=1,2,3,4;
z=1,2,3,4;
m=z or m≠z; and
A, B, C, D=—(CH$_2$)$_m$—H, —O—(CH$_2$)$_z$—H, OH;
wherein A, B, C, and D may differ from one another or be identical.

Preferably, the compounds described in formula I are added to the rubber powder preparation process individually or in a mixture in amounts of from 0.5 to 7% by weight, preferably from 1 to 3%, based on the weight of the filler. These ranges include all values and subranges therebetween, including 0.6, 0.7, 0.8, 0.9, 1.1, 2, 4, 5, 6 and 6.9%. Preferably, the compounds are added during the preparation of the filler suspension.

Preferably, the surface-active substances used include, where appropriate, non-ionic surfactants selected from the group including alcohol polyethylene glycol ethers, polyethylene glycol monomethyl ethers, phenol polyethylene glycol ethers, alkylphenol polyethylene glycol ethers, and alkylphenol polypropylene glycol ethers, alone or in a mixture, in amounts of from 0.1 to 2% by weight, preferably from 0.25 to 1%, based on the weight of the filler. These ranges include all values and subranges therebetween, including 0.2, 0.3, 0.4, 0.5, 0.6, 0.7, 0.8, 0.9, 1.1, 1.5, 1.7 and 1.9%. The addition of these substances preferably takes place during the preparation of the filler suspension.

Preferable grades of rubber which may be used, individually or mixed with one another, include any of the grades which can be prepared in the form of an aqueous emulsion. It is not important here whether they are prepared (polymerized) directly in water, so that the rubber is provided as an emulsion in water, or whether the rubber forms an emulsion only after the use of suitable processes. More preferable grades of rubber which may be used include one or more of the following:

natural rubber, emulsion SBR with styrene contents of from 10 to 50%, acrylonitrile rubber (NBR) with various acrylonitrile contents, butyl and halobutyl rubbers, ethylene-propylene rubber with or without a tercomponent (EPM and EPDM, respectively), chloroprene rubber, butadiene rubber (BR), styrene-butadiene rubber from the solution polymerization process (SSBR), and isoprene rubbers. Mixtures are possible.

The solids content of the rubber emulsions used is preferably from 15 to 65%, more preferably from 20 to 30% by weight, based on the weight of the rubber emulsion. These ranges include all values and subranges therebetween, including 16, 17, 18, 19, 25, 35, 40, 45, 50, 55 and 60%.

Preferable silicatic and/or oxidic fillers (i.e., pale colored filler) include those having nitrogen surface areas of from 0.5 to 700 m$^2$/g. This range includes all values and subranges therebetween, including 1, 10, 20, 50, 75, 100, 200, 300, 400, 500, 600, and 650 m$^2$/g. Preferable examples include fumed or precipitated silicas, and also silicates, various grades of clays, siliceous chalks, chalks, and hydroxides and oxides. Amounts of from 10 to 1000 parts of the fillers, based on 100 parts of rubber, are preferred as constituent of the rubber powders or, respectively, pellets of the invention. These ranges include all values and subranges therebetween, including 20, 40, 60, 80, 100, 200, 300, 400, 500, 600, 700, 800, and 900 parts filler. Fillers may be used here individually or in a mixture.

Besides the pale-coloured fillers, the products of the invention may also contain other fillers used in the rubber industry, most preferably industrial carbon blacks. These include furnace, gas, thermal, and flame blacks with an iodine adsorption value of from 5 to 1000 m$^2$/g, a CTAB value of from 15 to 600 m$^2$/g, and a DBP value of from 30 to 400 ml/100 g. These ranges include all values and subranges therebetween, including, respectively, 10, 20, 50, 100, 200, 300, 400, 500, 600, 700, 800, and 900m$^2$/g (iodine adsorption value); 20, 40, 60, 80, 100, 200, 300, 400, and 500 m$^2$/g (CTAB value); and 35, 40, 45, 50, 55, 60, 65, 70, 75, 100, 200, and 300 ml/100 g (DBP value).

Preferably, the other filler level in the product may be from 5 to 1000 parts by weight, based on 100 parts of the product, this filler level being added to the filler level of the pale-coloured fillers. This range includes all values and subranges therebetween, including 10, 20, 40, 60, 80, 100, 200, 300, 400, 500, 600, 700, 800, and 900 parts by weight, based on 100 parts of the product.

Both in the case of the pale-coloured fillers and in that of the carbon blacks, it is preferable to take the fillers at an early stage from their preparation process and introduce them into the preparation of the rubber powder.

The process of the invention preferably includes the preparation of rubber powders/pellets which contain silicatic and/or oxidic fillers without hydrophobicization of the filler by means of organosilanes. However, in some application sectors (e.g. high-abrasion-resistance sports shoe soles) for which the products of the invention could be used it may be preferable to add small amounts of organosilanes to the rubber powder preparation process in order to achieve the required property profile. However, the function of the organosilane here is not primarily in the preparation of the rubber powder but in its subsequent use. The amount of silane used would also generally be too low for hydrophobicization of the filler as a precondition for rubber powder preparation.

Preferably, the organosilicon compounds are products of the general formulae (II–IV):

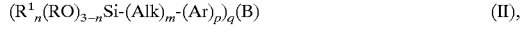 (II),

 (III), or

 (IV);

wherein:
B: is —SCN, —SH, —Cl, —NH$_2$ (if q=1) or —S$_x$—(if q=2)

R and R$^1$: are an alkyl group having 1, 2, 3 or 4 carbon atoms, branched or unbranched, or the phenyl radical, where each radical R and R$^1$ may be the same or different, preferably an alkyl group, R: is —C$_1$, C$_2$, C$_3$, or C$_4$-alkyl or a —C$_1$, C$_2$, C$_3$, or C$_4$-alkoxy group, branched or unbranched, n: is 0, 1, or 2, Alk: is a bivalent straight-chain or branched carbon radical having 1, 2, 3, 4, 5 or 6 carbon atoms, m: is 0 or 1, Ar: is an arylene radical having 6, 7, 8, 9, 10, 11 or 12 carbon atoms, p: is 0 or 1 with the proviso that p and n are not simultaneously 0, x: is 2, 3, 4, 5, 6, 7, or 8, Alkyl: is a monovalent, straight-chain or branched saturated hydrocarbon radical having 1, 2, 3, 4, 5, 6, 7, 8, 9, 10, 11, 12, 13, 14, 15, 16, 17, 18, 19 or 20 carbon atoms, preferably from 2 to 8 carbon atoms, and Alkenyl: is a monovalent, straight-chain or branched, unsaturated hydrocarbon radical having 2, 3, 4, 5, 6, 7, 8, 9, 10, 11, 12, 13, 14, 15, 16, 17, 18, 19 or 20 carbon atoms, preferably from 2 to 8 carbon atoms.

Preferable amounts of from 0.2 to 5 parts, more preferably from 0.5 to 1 part, of the compounds, based on 100 parts of rubber, may be added to the rubber powder preparation process individually or in a mixture together with the polysiloxanes. These ranges include all values and subranges therebetween, including 0.3, 0.4, 0.5, 0.6, 0.7, 0.8, 0.9, 1, 2, 3, and 4 parts.

Besides the organosilanes and fillers mentioned, the rubber powders/pellets of the invention may, where appropriate, also contain conventional amounts of other mixing constituents used in the rubber industry. Preferred examples of these include mineral oil plasticizers, zinc salts, stearic acid, polyalcohols, polyamines, antioxidants for protection from heat, light, and oxygen or ozone, waxes, resins, pigments, and crosslinking chemicals, and also sulphur. Mixtures are possible.

Preferably, the rubber powders obtained by the preparation method described above and present in water are then isolated mechanically from most of the process water. Here, the term, "most" of the process water means more than 50% by weight, which range includes all values and subranges therebetween, including 55, 60, 75, 80, 90, 95, 96, 97 and 98% by weight of the process water. Processes available in the market may be used for this purpose. However, the use of a chamber filter press or inverting filter centrifuge is more preferred. Once most of the process water has been removed, it may, where appropriate, be necessary to subject the filtercake to additional shaping. The conventional assemblies marketed for filter-cake comminution and pelletization are preferable in this context.

A thermal drying procedure to residual moisture ≦3% preferably ≦1%, is preferably carried out in a fluidized bed. These ranges include all values and subranges therebetween, including 0.1, 0.2, 0.3, 0.4, 0.5, 06, 0.7, 0.8, 0.9, 1.1, 1.5, 2, 2.5 and 2.9%.

The rubber powders of the invention are especially suitable for preparing vulcanizable mixtures. These products may be used batchwise in the current process (internal mixer, roll mill), or else in new mixing processes which operate continuously, for example using mixing extruders (Delphi-Report 'Künftige Herstellungsverfahren in der Gummiindustrie' (Future production processes in the rubber industry), Rubber J. 154 (1972) 20; Kautsch. Gummi Kunstst. 26 (1973) 127; and EP 00 111 524.5, the entire contents of each of which are hereby incorporated by reference).

One preferred embodiment of the invention relates to a process for preparing rubber powders or, respectively, pellets based on aqueous rubber emulsions or lattices and comprising silicatic and/or oxidic fillers, by acid-catalyzed pH-controlled rubber coagulation, and to the use of the products in vulcanizable rubber mixtures, and in the environmental sector as adsorbents or absorbents, and also in the buildings sector, as sealing compounds.

Other preferred fields of application for the products of the invention are in the environmental sector (EP 00 110 033.8, incorporated herein by reference), e.g. for adsorbing organic contaminants from water or adsorbing gases and vapours, and also in the buildings sector, as sealing compounds (DE 199 41 527.7-45, incorporated herein by reference).

EXAMPLES

Having generally described the invention, a further understanding can be obtained by reference to certain specific examples, which are provided herein for purposes of illustration only and are not intended to be limiting unless otherwise specified.

| Raw materials used for preparing the exemplary rubber powders of the invention | |
|---|---|
| ESBR 1500 | Emulsion styrene-butadiene latex with 23.5% styrene content (BSL) |
| Ultrasil 7000 | Fine-particle silica with $N_2$ surface area of 180 $m^2/g$ in the form of its filtercake (Degussa) washed until free from salts |
| Marlipal 1618/25 | Emulsifier: fatty alcohol polyethylene glycol ether (Condea) |
| Si69 | Bis(triethoxysilylpropyl) tetrasulphane (Degussa) |
| Silicone rubb. NG 200-80 | Hydroxy-terminated polydimethylsiloxanediol (Wacker) |
| Chalk | Naturally occurring filler $CaCO_3$ |

Preparation Examples

1. Product of the Invention Based on ESBR/Ultrasil 7000 (50 phr)

Weights Used:

| | |
|---|---|
| 1616 g | of ESBR 1500 emulsion (solids: 21.7%) |
| 716 g | of Ultrasil 7000 filtercake (solids: 23.3%) |
| 0.9 g | of Marlipal 1618/25 |
| 1.75 g | of NG 200-80 silicone rubber |

Conduct of Experiment

Ultrasil 7000 filtercake, Marlipal, and silicone rubber are suspended in water with stirring by means of an Ultra-Turrax. The solids content of the suspension is 6%. The ESBR emulsion is then added and the pH of the suspension is lowered to 4.5, whereupon the desired rubber powder precipitates. Finally, it is isolated from most of the water in a Büchner funnel, pressed through a screen, thus shaped, and in conclusion dried to residual moisture of 2% in a drying cabinet.

The product (EPR I) produced is a free-flowing, non-adhesive powder. Thermogravimetric analysis (TGA) gave a filler content of 50.7 phr.

2. Product of the Invention Based on ESBR/Ultrasil 7000 (80 phr)/Si69(1.5 phr)

Weights Used:

| | |
|---|---|
| 1559 g | of ESBR 1500 emulsion (solids: 21.7%) |
| 1058 g | of Ultrasil 7000 filtercake (solids: 23.3%) |
| 2.6 g | of Marlipal 1618/25 |

-continued

| | |
|---|---|
| 9.19 g | of NG 200-80 silicone rubber |
| 5.3 g | of Si 69 |

Conduct of Experiment:

Ultrasil 7000 filtercake, Marlipal, silicone rubber, and Si 69 are suspended in water with stirring by means of an Ultra-Turrax. The solids content of the suspension is 7%. The ESBR emulsion is then added and the pH of the suspension is lowered to 4.3, whereupon the desired rubber powder precipitates. Finally, it is isolated from most of the water in a Büchner funnel, pressed through a screen, thus shaped, and in conclusion dried to residual moisture of 2% in a drying cabinet.

The product (EPR II) produced is a free-flowing, non-adhesive powder.

Thermogravimetric analysis (TGA) gave a filler content of 78.1 phr.

3. Product of the Invention Based on ESBR/Chalk (50 phr)

Weights Used:

| | |
|---|---|
| 1616 g | of ESBR 1500 emulsion (solids: 21.7%) |
| 175 g | of chalk powder |
| 1.7 g | of Marlipal 1618/25 |
| 3.5 g | of NG 200-80 silicone rubber |

Conduct of Experiment:

Chalk, Marlipal, and silicone rubber are suspended in water with stirring by means of an Ultra-Turrax. The solids content of the suspension is 10%. The ESBR emulsion is then added and the pH of the suspension is lowered to 4.0, whereupon the desired rubber powder precipitates. Finally, it is isolated from most of the water in a Büchner funnel, pressed through a screen, thus shaped, and in conclusion dried to residual moisture of 2% in a drying cabinet.

The product produced is a free-flowing, non-adhesive powder. Thermogravimetric analysis (TGA) gave a filler content of 52.1 phr.

Application Examples

Test Standards in Rubber Technology:

| | |
|---|---|
| Vulcameter | DIN 53 529 |
| Mooney viscosity | DIN 53 523 |
| Ring tensile test | DIN 53 504 |
| Shore hardness | DIN 53 505 |
| Tear propagation resistance | ASTM D 624 |
| Abrasion | DIN 53 516 |

(the entire contents of each of the above test standards is hereby incorporated by reference).

1. EPR I (ESBR 1500/Ultrasil 7000 50 phr) Against the Appropriate Standard
a) Mixing Specification

| Mixing constituents | Standard | EPR I |
|---|---|---|
| ESBR 1500 | 100 | — |
| EPR I | — | 150 |
| Ultrasil 7000 GR | 50 | — |
| ZnO | 5 | 5 |

-continued

| Mixing constituents | Standard | EPR I |
|---|---|---|
| Stearic acid | 1 | 1 |
| PEG 4000 | 3 | 3 |
| MBTS | 1.2 | 1.2 |
| MBT | 0.7 | 0.7 |
| DPG | 0.5 | 2.0 |
| Sulphur | 2.0 | 2.0 | b) Mixing Instructions

| Brabender 350 S; 0.345 L; friction 1:1.11; 60 rpm, ram 5.5 bar | | | |
|---|---|---|---|
| 1st stage | | 1st stage | |
| 0–1' | Rubber | 0.1' | EPR I, ZnO, stearic acid, PEG |
| 1–1.5' | ½ silica, ZnO, stearic acid, PEG | 1–3' | Mixing and discharge |
| 1.5–2' | ½ silica | | |
| 2–3' | Mixing and discharge | | |
| Batch temp. 147° C. | | Batch temp. 150° C. | |
| 2nd stage | | 2nd stage | |
| 0–0.5' | Stage 1 batch, accelerator, sulphur | 0–0.5' | Stage 1 batch, accelerator, sulphur |
| 0.5–1.5' | Mixing and discharge | 0.5–1.5' | Mixing and discharge |
| Batch temp. 105° C. | | Batch temp. 107° C. | | c) Vulcanization-related Property Profile
   Vulcanization: 18 min at 165° C.

| Test method | Unit | Standard | EPR I |
|---|---|---|---|
| ML 1 + 4 (100° C.) 2nd st. | — | 139 | 119 |
| T 10% | min | 1.5 | 2.4 |
| T 90% | min | 3.5 | 5.4 |
| Tensile strength | MPa | 10.2 | 13.2 |
| 300% modulus | MPa | 3.7 | 6.3 |
| Tensile strain at break | % | 630 | 590 |
| Fracture energy | J | 69.2 | 83.0 |
| Shore hardness | | 69 | 71 |
| Tear propagation resistance | | | |
| Die C | N/mm | 35 | 52 |
| Abrasion | mm$^3$ | 200 | 177 |

Compared with the standard, the product of the invention gives improvements in viscosity, in the strength and ultimate tensile values, and in abrasion. Reinforcement performance is moreover markedly higher. The function of the use of polysiloxanes is therefore not merely the preparation of the rubber powders: their use also improves application-related data.

2. EPR II (ESBR 1500/Ultrasil 7000 (80 phr)/Si 69 (1.5 phr) Compared with Appropriate Standard
a) Mixing Specification

| Mixing constituents | Standard | EPR II |
|---|---|---|
| ESBR 1500 | 100 | — |
| EPR II | — | 180 |
| Ultrasil 7000 GR | 80 | — |
| Si 69 | 1.5 | — |
| ZnO | 3 | 3 |
| Stearic acid | 2 | 2 |

-continued

| Mixing constituents | Standard | EPR II |
|---|---|---|
| 6PPD | 2.0 | 2.0 |
| Wax | 1.0 | 1.0 |
| CBS | 1.7 | 1.7 |
| DPG | 2.0 | 2.0 |
| Sulphur | 1.5 | 1.5 | b) Mixing Instructions

Brabender 350 5; 0.345 L; friction 1:1.11; 60 rpm, ram 5.5 bar

| 1st stage | | 1st stage | |
|---|---|---|---|
| 0–1' | Rubber | 0.1' | EPR II, ZnO, stearic acid, 6PPD, wax |
| 1–2' | ½ silica, ZnO, stearic acid, Si 69, 6PPD, wax | 1–4' | Mixing and discharge |
| 2–3' | ½ silica | | |
| 3–4' | Mixing and discharge | | |
| Batch temp. 144° C. | | Batch temp. 148° C. | |
| 2nd stage | | 2nd stage | |
| 0–3' | Stage 1 batch Mixing and discharge | 0–3' | Stage 1 batch, Mixing and discharge |
| Batch temp. 142° C. | | Batch temp. 147° C. | |
| 3rd stage | | 3rd stage | |
| 0–0.5' | Stage 1 batch, accelerator, sulphur | 0–0.5' | Stage 1 batch, accelerator, sulphur |
| 0.5–1.5' | Mixing and discharge | 0.5–1.5' | Mixing and discharge |
| Batch temp. 101° C. | | Batch temp. 104° C. | | c) Vulcanization-related Property Profile
Vulcanization: 15 min at 165° C.

| Test method | Unit | Standard | EPR I |
|---|---|---|---|
| T 10% | min | 6.7 | 5.4 |
| T 90% | min | 10.6 | 8.0 |
| Tensile strength | MPa | 14.3 | 14.5 |
| 300% modulus | MPa | 2.8 | 4.6 |
| Shore hardness | | 60 | 62 |
| Tear propagation resistance | | | |
| Die C | N/mm | 45 | 48 |
| Abrasion | mm³ | 255 | 175 |

The product of the invention has increased reinforcement performance and markedly better abrasion resistance.

Oviously, numerous modifications and variations of the present invention are possible in light of the above teachings. It is therefore to be understood that within the scope of the apended claims, the invention may be practiced otherwise than as specifically described herein.

This application is based on German patent application, DE 10151430.1, filed Oct. 18, 2001, the entire contents of which are hereby incorporated by reference.

what is claimed is:

1. A process, comprising:
   a) suspending:
      at least one filler selected from the group consisting of silicatic filler, oxidic filler, and a mixture thereof,
      0.5 to 7% by weight, based on the weight of the filler, of at least one polysiloxane hydrophobicizing agent, and
      0.1 to 2% by weight, based on the weight of the filler, of at least one non-ionic surfactant,
      in water at a temperature of 10 to 60° C.,
      to prepare a suspension having a solids content of 0.5 to 15% by weight, based on the weight of the suspension;
   b) contacting a rubber latex emulsion and the suspension, to prepare a mixture;
   c) contacting the mixture with at least one acid to lower the pH of the mixture to 2.5–7, to prepare a filled rubber powder precipitate and a liquid;
   d) separating at least a portion of the liquid from the filled rubber powder precipitate, to form a filtercake comprising the filled rubber powder precipitate;
   e) optionally shaping, comminuting, or pelletizing the filtercake, and
   f) drying to a moisture level of 3% by weight.

2. The process as claimed in claim 1, wherein the polysiloxane hydrophobicizing agent comprises one or more polysiloxanes having the following formula I:

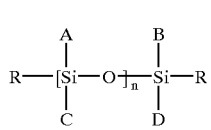

(Formula I)

wherein:
   n=1–1000
   R=—$(CH_2)_m$—H, O—$(CH_2)_z$—H, OH, or vinyl,
   m=1–4,
   z=1–4,
   m=z or m≠z, and
   A, B, C, D=—$(CH_2)_m$—H, —O—$(CH_2)_z$—H, or OH,
   wherein A, B, C, and D may be the same or different.

3. The process as claimed in claim 1, wherein the polysiloxane hydrophobicizing agent comprises more than one polysiloxane, which are suspended individually or in a mixture.

4. The process as claimed in claim 1, wherein the non-ionic surfactant is selected from the group consisting of alcohol polyethylene glycol ether, polyethylene glycol monomethyl ether, phenol polyethylene glycol ether, alkylphenol polyethylene glycol ether, alkylphenol polypropylene glycol ether, and a mixture thereof.

5. The process as claimed in claim 1, wherein the rubber latex emulsion comprises one or more rubbers selected from the group consisting of natural rubber, emulsion SBR with styrene contents of from 10 to 50%, acrylonitrile rubber, butyl rubber, halobutyl rubber, ethylene-propylene rubber, EPDM, chloroprene rubber, butadiene rubber, styrene-butadiene rubber from a solution polymerization process (SSBR), isoprene rubber, and mixtures thereof.

6. The process as claimed in claim 1, wherein the filler has a nitrogen surface area of 0.5 to 700 m²/g.

7. The process as claimed in claim 1, wherein (a) further comprises suspending at least one industrial carbon black.

8. The process as claimed in claim 1, wherein (a) further comprises suspending at least one industrial carbon black having an iodine adsorption value of 5 to 1000 m²/g, a CTAB value of 15 to 600 m²/g, and a DBP value of 30 to 400 ml/100 g.

9. The process as claimed in claim 1, wherein (a) further comprises suspending at least one industrial carbon black, and wherein the industrial carbon black is prepared by a process selected from the group consisting of a furnace black process, a gas black process, a thermal black process, and a flame black process.

10. The process as claimed in claim 1, wherein the filler is present in an amount of 10 to 1000 parts by weight, based on 100 parts of the rubber.

11. The process as claimed in claim 1, wherein (a) further comprises suspending at least one industrial carbon black, and wherein the carbon black is present in an amount of 5 to 1000 parts by weight, based on 100 parts of the rubber.

12. The process as claimed in claim 1, wherein any of (a–f) further comprises adding at least one bifunctional organosilane selected from the group consisting of formulas II, III, IV and a combination thereof in amounts of from 0.2 to 5 parts by weight, based on 100 parts of rubber:

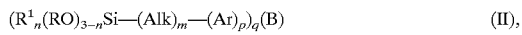

$(R^1{}_n(RO)_{3-n}Si\text{—}(Alk)_m\text{—}(Ar)_p)_q(B)$      (II),

$R^1{}_n(RO)_{3-n}Si\text{-}(Alkyl)$      (III),

$R^1{}_n(RO)_{3-n}Si\text{-}(Alkenyl)$      (IV), where

B: is —SCN, —SH, —Cl, —NH$_2$ (if q=1) or —S$_x$— (if q=2),

R and R$^1$: are each independently a branched or unbranched alkyl group having 1 to 4 carbon atoms; or phenyl radical, R: is a branched or unbranched —C$_1$–C$_4$-alkyl or a branched or unbranched —C$_1$–C$_4$-alkoxy group, n: is 0, 1 or 2, Alk: is a bivalent straight-chain or branched carbon radical having from 1 to 6 carbon atoms, m: is 0 or 1, Ar: is an arylene radical having from 6 to 12 carbon atoms, p: is 0 or 1 with the proviso that p and n are not simultaneously 0, x: is a number from 2 to 8, Alkyl: is a monovalent, straight-chain or branched saturated hydrocarbon radical having from 1 to 20 carbon atoms, and Alkenyl: is a monovalent, straight-chain or branched, unsaturated hydrocarbon radical having from 2 to 20 carbon atoms.

13. The process as claimed in claim 1, wherein any of (a–f) further comprises contacting at least one selected from the group consisting of mineral oil plasticizer, zinc salt, stearic acid, polyalcohol, polyamine, antioxidant, wax, resin, pigment, crosslinker, sulfur, and mixtures thereof.

14. The process as claimed in claim 1, further comprising preparing a shaped, comminuted, or pelletized filtercake.

15. The process as claimed in claim 1, wherein the acid is selected from the group consisting of sulphuric acid, aluminium sulphate, and mixtures thereof.

16. The process as claimed in claim 1, wherein (b) is carried out with stirring.

17. The process as claimed in claim 1, wherein the moisture level is less than 3%.

18. The process as claimed in claim 1, further comprising preparing a vulcanizable rubber mixture.

19. A composition, prepared by the process as claimed in claim 1.

20. The composition as claimed in claim 19, which is an adsorbent, absorbent, or a sealing compound.

21. A method, comprising contacting the composition of claim 19 with at least one selected from the group consisting of a surface, a gas phase organic substance, and an aqueous phase organic substance.

* * * * *